United States Patent
Dykstra Erickson et al.

(10) Patent No.: US 10,809,880 B2
(45) Date of Patent: Oct. 20, 2020

(54) METHOD FOR MANAGING MULTIPLE TYPES OF DATA

(71) Applicant: Chiun Mai Communication Systems, Inc., New Taipei (TW)

(72) Inventors: Elizabeth Ann Dykstra Erickson, San Francisco, CA (US); Hiroyuki Toki, San Jose, CA (US); Hsin-Chieh Lin, New Taipei (TW); Hui-Hsuan Lien, New Taipei (TW); Erik Paul Anderson, New Taipei (TW); Chih-Yu Chueh, New Taipei (TW); Yu-Hua Hung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 244 days.

(21) Appl. No.: 15/499,910

(22) Filed: Apr. 28, 2017

(65) Prior Publication Data

US 2017/0315684 A1    Nov. 2, 2017

Related U.S. Application Data

(60) Provisional application No. 62/329,193, filed on Apr. 28, 2016.

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0484* (2013.01); *G06F 3/0488* (2013.01);
(Continued)

(58) Field of Classification Search
CPC .. G06F 3/04883; G06F 3/0481; G06F 3/0488; G06Q 10/109
See application file for complete search history.

(56) References Cited

U.S. PATENT DOCUMENTS

| | | | |
|---|---|---|---|
| 2001/0028368 A1* | 10/2001 | Swartz | G06F 3/0481 715/835 |
| 2007/0118800 A1* | 5/2007 | Moore | G11B 27/034 715/730 |

(Continued)

FOREIGN PATENT DOCUMENTS

| | | |
|---|---|---|
| EP | 2778870 A1 | 9/2014 |
| EP | 2993567 A1 | 3/2016 |
| WO | 2012146900 A1 | 11/2012 |

OTHER PUBLICATIONS

M. La Cascia, M. Morana and S. Sorce, "Mobile Interface for Content-Based Image Management," 2010 International Conference on Complex, Intelligent and Software Intensive Systems, Krakow, 2010, pp. 718-723, doi: 10.1109/CISIS.2010.172. (Year: 2010).*

*Primary Examiner* — James T Tsai
(74) *Attorney, Agent, or Firm* — ScienBiziP, P.C.

(57) ABSTRACT

A method of managing data of an electronic device includes capturing contents from user interfaces of programs displayed on a display of the electronic device. An application layer is displayed on the display when each content is captured. Each content is moved to the application layer in response to a predetermined input. Contents in the application layer are arranged in a first layout, and can be arranged in a second layout when the second layout is selected.

28 Claims, 15 Drawing Sheets

(51) Int. Cl.
*G06F 3/0488* (2013.01)
*G06F 40/106* (2020.01)
*G06F 3/0481* (2013.01)
*G06Q 10/10* (2012.01)

(52) U.S. Cl.
CPC ...... *G06F 3/04817* (2013.01); *G06F 3/04883* (2013.01); *G06F 40/106* (2020.01); *G06Q 10/109* (2013.01)

(56) References Cited

U.S. PATENT DOCUMENTS

| | | | |
|---|---|---|---|
| 2009/0313304 A1* | 12/2009 | Goodger | G06F 16/986 |
| 2011/0161432 A1* | 6/2011 | Ellanti | G06Q 10/109 |
| | | | 709/206 |
| 2012/0124524 A1* | 5/2012 | Frank Szarfman | G06F 3/0481 |
| | | | 715/843 |
| 2013/0227471 A1* | 8/2013 | Cha | G06F 3/0488 |
| | | | 715/790 |
| 2014/0237405 A1* | 8/2014 | Wu | G06F 9/451 |
| | | | 715/765 |
| 2014/0365851 A1* | 12/2014 | Kroupa | G06F 17/2229 |
| | | | 715/205 |
| 2014/0372919 A1* | 12/2014 | Fan | G06T 11/60 |
| | | | 715/765 |
| 2015/0177954 A1* | 6/2015 | Wei | G06F 3/0482 |
| | | | 715/738 |
| 2015/0324381 A1* | 11/2015 | Brand | G06F 21/6218 |
| | | | 707/829 |
| 2015/0358790 A1* | 12/2015 | Nasserbakht | H04W 4/16 |
| | | | 455/414.1 |
| 2016/0027050 A1* | 1/2016 | Chong | G06Q 30/0255 |
| | | | 705/14.53 |
| 2016/0062557 A1* | 3/2016 | Kim | G06F 3/0481 |
| | | | 715/748 |
| 2018/0032997 A1* | 2/2018 | Gordon | G06Q 20/3224 |

* cited by examiner

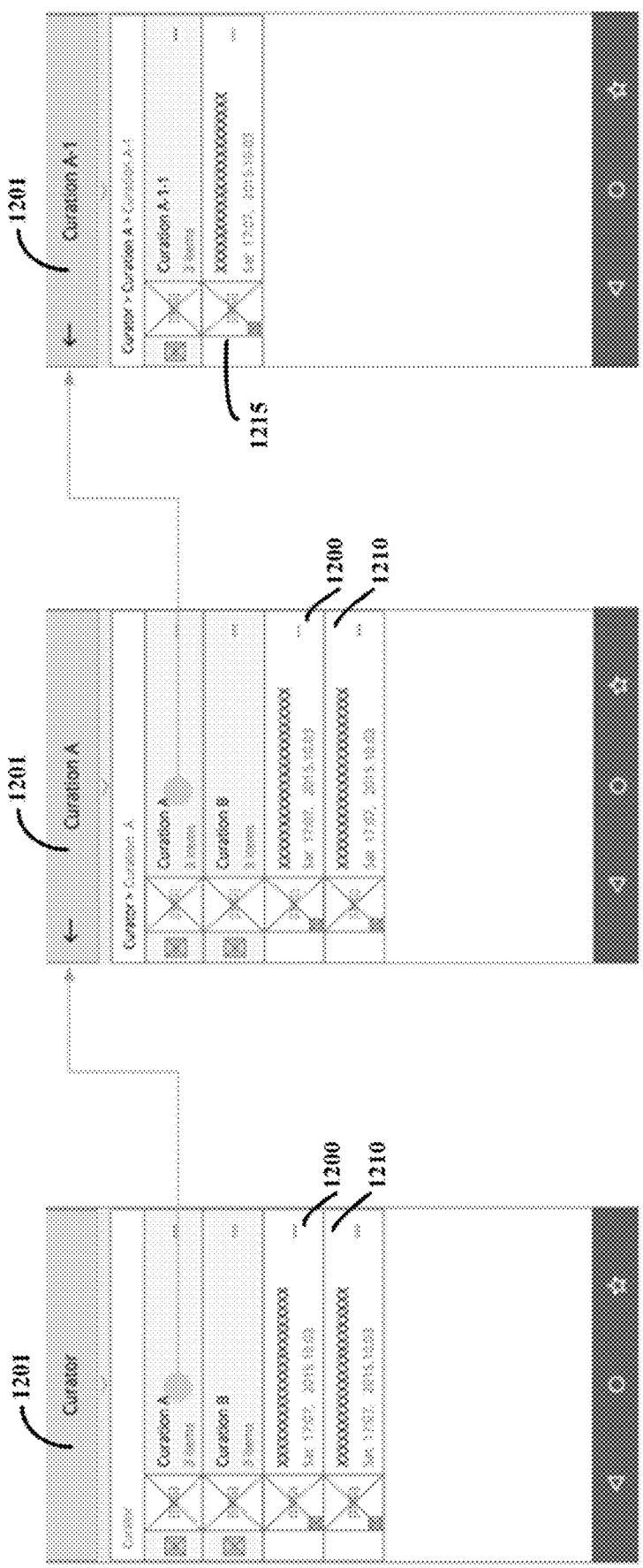

METHOD FOR MANAGING MULTIPLE TYPES OF DATA

CROSS-REFERENCE TO RELATED APPLICATIONS

This application claims priority to U.S. Provisional Application No. 62/329,193 filed on Apr. 28, 2016, the contents of which are incorporated by reference herein.

FIELD

The subject matter herein generally relates to managing technology, and particularly to a method of managing multiple types of data.

BACKGROUND

A mobile device includes data of different types (e.g., a photo, a text file, and a text string). A user of the mobile device often resorts to cloud services to save and manage the data. However, as the user does collect, arrange, store, and frequently re-visit the data that crosses applications, there is no easy way to manage the data among different applications.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIGS. 5A-5C illustrate an example of a first application layout and its folder and subfolder.

DETAILED DESCRIPTION

Figure 1:
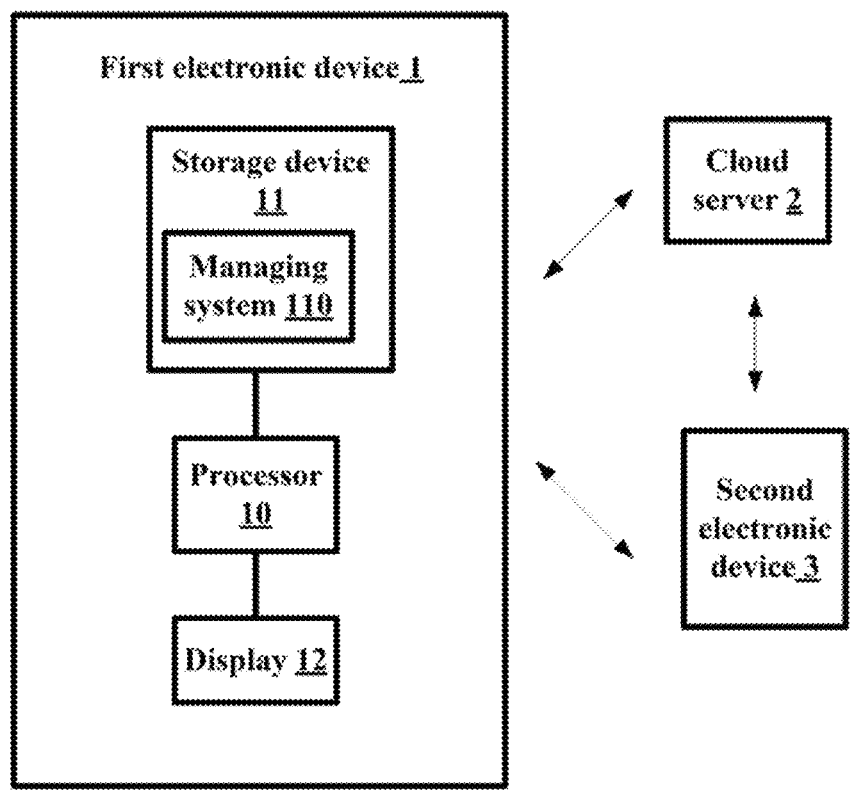
FIG. 1 is a block diagram of one exemplary embodiment of a first electronic device including a managing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of a first electronic device 1 being in communication with a cloud server 2 and a second electronic device 3. Depending on the embodiment, the first electronic device 1 can include, but is not limited to, at least one processor 10, a storage device 11, and a display 12. In at least one embodiment, the first electronic device 1 and the second electronic device 3 can be a mobile phone, a tablet computer, a personal digital assistant, or any other electronic device having at least the processor 10, the storage device 11 and the display 12. FIG. 1 illustrates only one example of the first electronic device 1 and the second electronic device 3 that can include more or fewer components than illustrated, or have a different configuration of the various components in other embodiments. For example, the first electronic device 1 and the second electronic device 3 may further include lighting devices.

The processor 10 can be a central processing unit (CPU), a microprocessor, or other data processor chip that performs functions of the first electronic device 1.

The storage device 11 can be used to store all kinds of data of the first electronic device 1. For example, the storage device 11 can be used to store program codes of a managing system 110. For another example, the storage device 11 can be used to store photos, screenshots, text strings, text files, website links, links to files, video files and audio files of the first electronic device 1. In at least one exemplary embodiment, the storage device 11 can be an internal storage device, such as a flash memory, a random access memory (RAM) for temporary storage of information, and/or a read-only memory (ROM) for permanent storage of information. The storage device 11 can also be an external storage device, such as an external hard disk, a storage card, or a data storage medium.

In at least one exemplary embodiment, the display 12 can be a touch display such as a resistive touch screen, or a capacitive touch screen. In other exemplary embodiments, the display 12 also can be a non-touch display.

Figure 2:
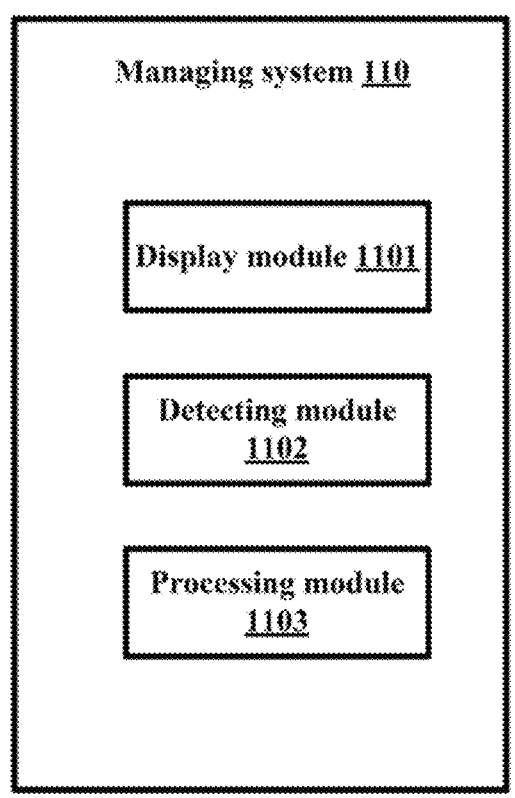
FIG. 2 is a block diagram of one exemplary embodiment of modules of the managing system of FIG. 1.

FIG. 2 illustrates a block diagram of one embodiment of modules of the managing system 110. In at least one exemplary embodiment, the managing system 110 can include a display module 1101, a detecting module 1102, and a processing module 1103. The modules 1101-1103 comprise computerized codes in the form of one or more programs that may be stored in the storage device 11. The computerized codes include instructions that are executed by the at least one processor 10.

Figure 3A:
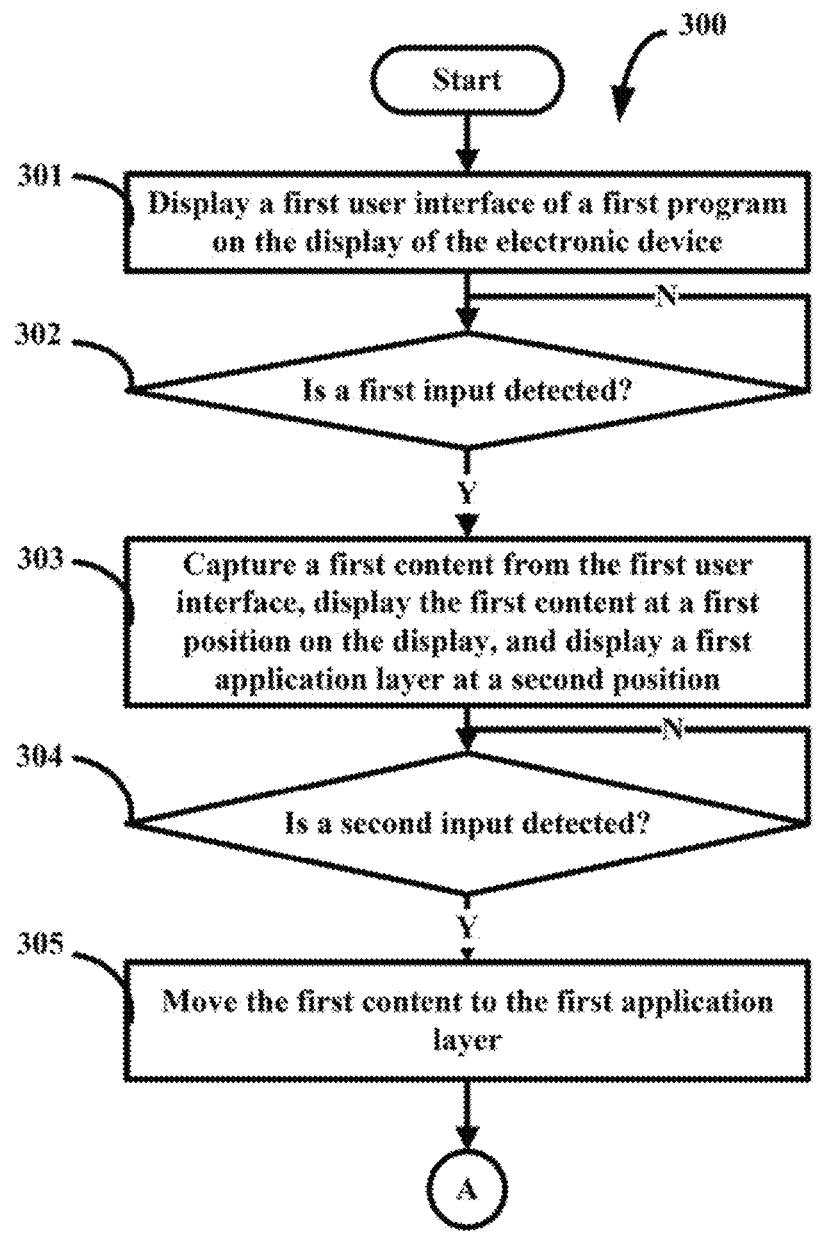
FIG. 3A illustrates a first flowchart of one exemplary embodiment of a method of capturing a first content using the managing system of FIG. 1.

FIG. 3A illustrates a flowchart which is presented in accordance with an example embodiment. The exemplary method 300 is provided by way of example, as there are a variety of ways to carry out the exemplary method. The exemplary method 300 described below can be carried out using the configurations illustrated in FIG. 1, for example, and various elements of these figures are referenced in explaining exemplary method 300. Each block shown in FIG. 3A represents one or more processes, methods, or subroutines, carried out in the exemplary method 300. Additionally, the illustrated order of blocks is by example only and the order of the blocks can be changed according to the present disclosure. The exemplary method 300 can begin at block 301. Depending on the embodiment, additional steps can be added, others removed, and the ordering of the steps can be changed.

At block 301, the display module 1101 can display a first user interface of a first program on the display 12 of the first electronic device 1.

For example, the display module 1101 can display a user interface of a browser on the display 12.

At block 302, the detecting module 1102 can detect whether a first input is received by the first electronic device 1. When the first input is detected by the detecting module 1102, the process goes to block 303.

In at least one exemplary embodiment, the step of detecting whether the first input is received comprises detecting whether a touch on a predetermined virtual key or a predetermined icon displayed on the display 12 is received. In one exemplary embodiment, the step of detecting whether the first input is received comprises detecting whether a press on a predetermined physical key (for example, a volume button assigned to modify volume) of the first electronic device 1 is received. In one exemplary embodiment, the step of detecting whether the first input is received comprises detecting whether a gesture via a sensor (for example, a proximity sensor) of the electronic device 1 is received. In another exemplary embodiment, the step of detecting whether the first input is received comprises detecting whether an audio command (e.g., any predetermined voice or sound) via a microphone of the electronic device 1 is received.

At block 303, when the first input is detected, the processing module 1103 can capture a first proxy view (hereinafter refer to as "first content") from the first user interface. The display module 1101 can display the first content at a first position on the display 12, and can display a curator (hereinafter refer to as "first application layer") at a second position on the display 12.

In at least one exemplary embodiment, the first content can be associated with at least one type of data including, but not limited to, a photo, a screenshot, a text string, a text file, a website link, a link to a file, a video file, or an audio file of the first program, or a combination thereof. For example, the first content is associated with a website link currently opened by the browser, a screenshot of a web page with a website link currently displayed on the display 12. In at least one exemplary embodiment, when the first content is captured, at least one of parameters, for example, an altitude, a location, a compass direction, level information, watermarks, or any combination of OSD (on screen display) can be captured or recorded together with the first content. In at least one exemplary embodiment, the first application layer is dragged out from a first border (e.g., a right border) of the display 12 when the first input is detected. In another embodiment, the first application layer is not limited to be dragged out but appears in any position or in any form (e.g. a transparent sheet), over an existing application on the display 12.

Figure 3B:
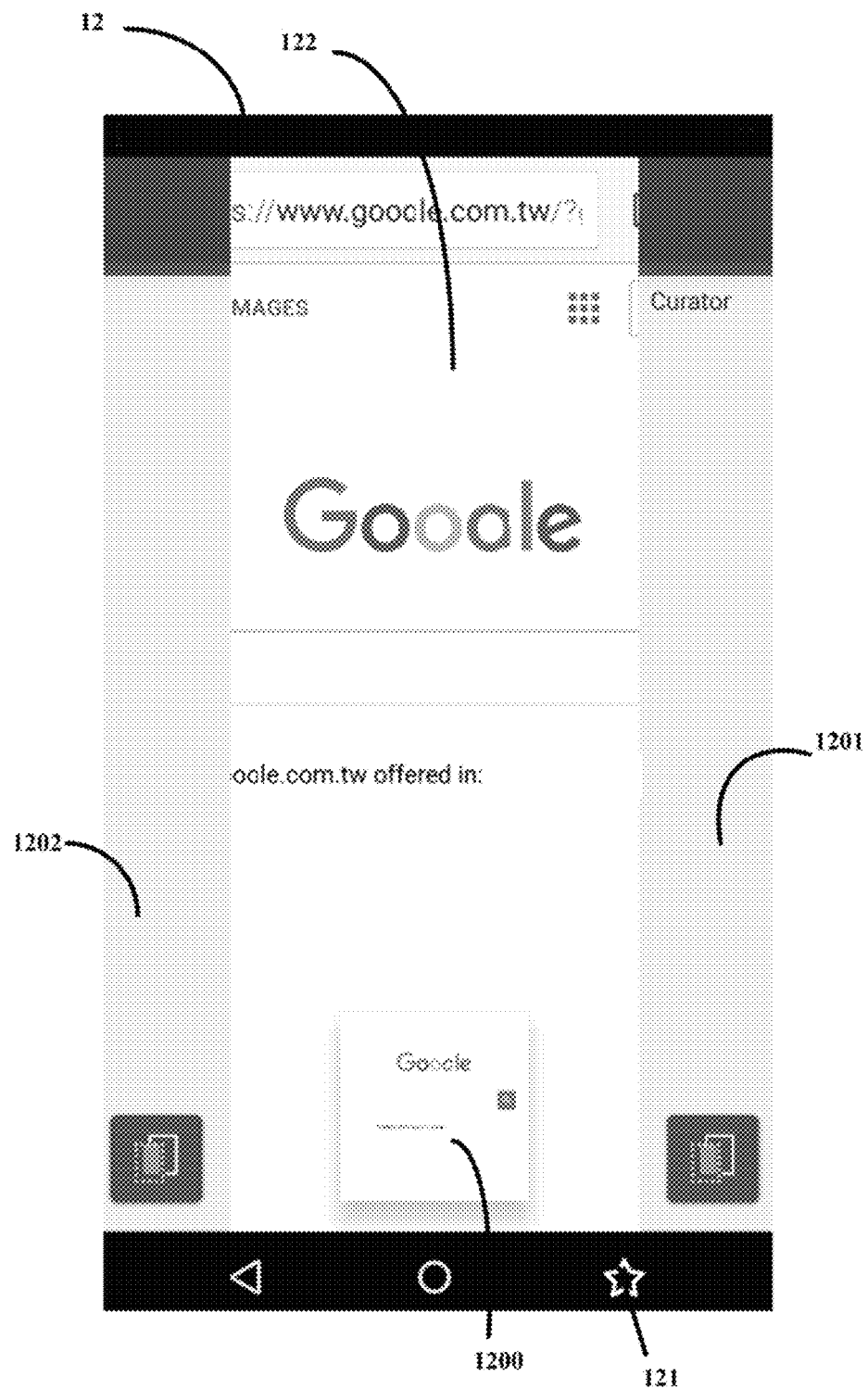
FIG. 3B illustrates an example of the first content.

For example, as shown in FIG. 3B, when a touch on a virtual icon 121 displayed on the display 12 is detected, the processing module 1103 can capture a first content 1200 from a first user interface 122 of a browser. The display module 1101 can display the first content 1200 at a lower middle position of the display 12. The display module 1101 can further display a first application layer 1201 at the right border of the display 12. In at least one exemplary embodiment, the first application layer 1201 is dragged out from the right border of the display 12. In another embodiment, the first application layer 1201 can appear in any position or in any form (e.g. a transparent sheet), over an existing application on the display 12.

At block 304, the detecting module 1102 can detect whether a second input is received by the first electronic device 1. When the second input is detected by the detecting module 1102, the processes goes to block 305.

In at least one exemplary embodiment, the step of detecting whether the second input is received comprises detecting whether a touch movement from the first position to the second position on the display 12 is received. In one exemplary embodiment, the step of detecting whether the second input is received comprises detecting whether a gesture via a sensor of the electronic device or a voice via a microphone of the electronic device is received. In one exemplary embodiment, the step of detecting whether the second input is received comprises detecting whether a press on a physical key associated with a copy function or a touch on a virtual key associated with a copy function is received.

Figure 4A:
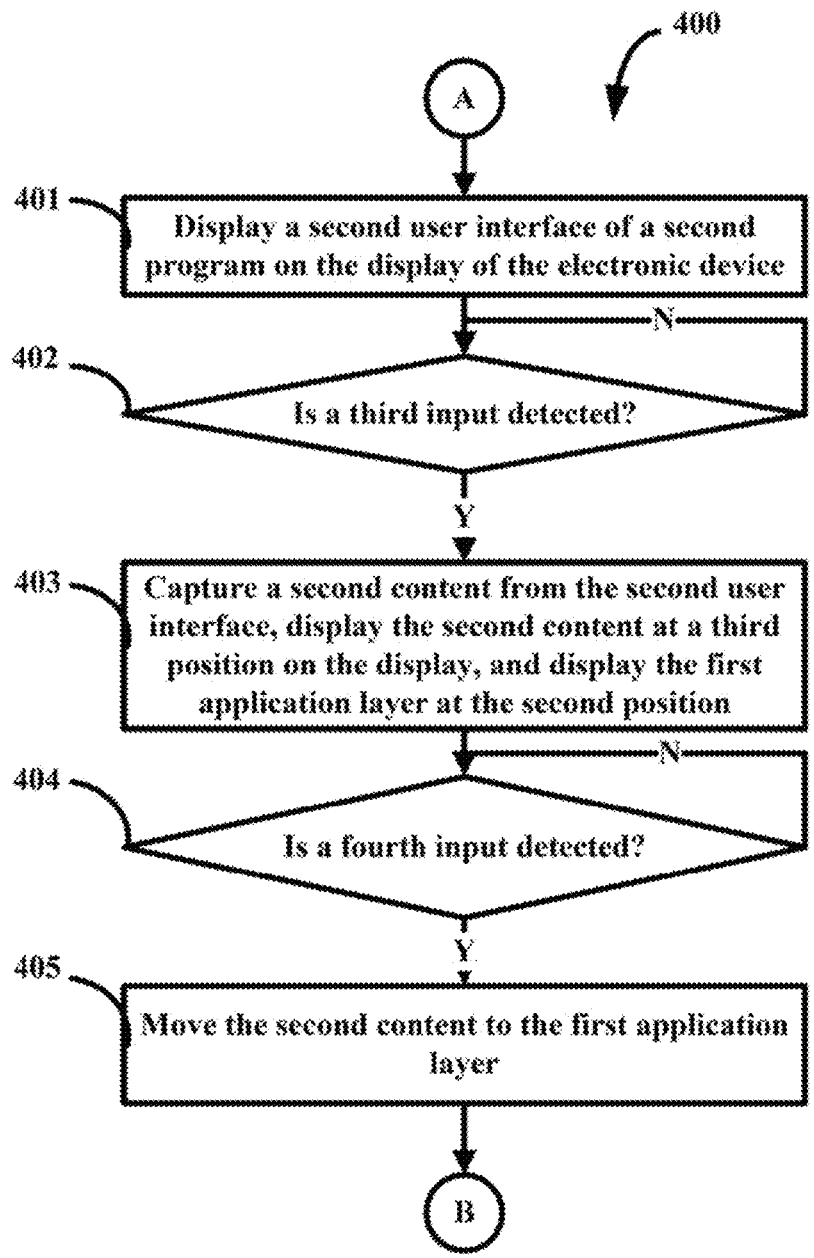
FIG. 4A illustrates a second flowchart of one exemplary embodiment of a method of capturing a second content using the managing system of FIG. 1.
Figure 4B:
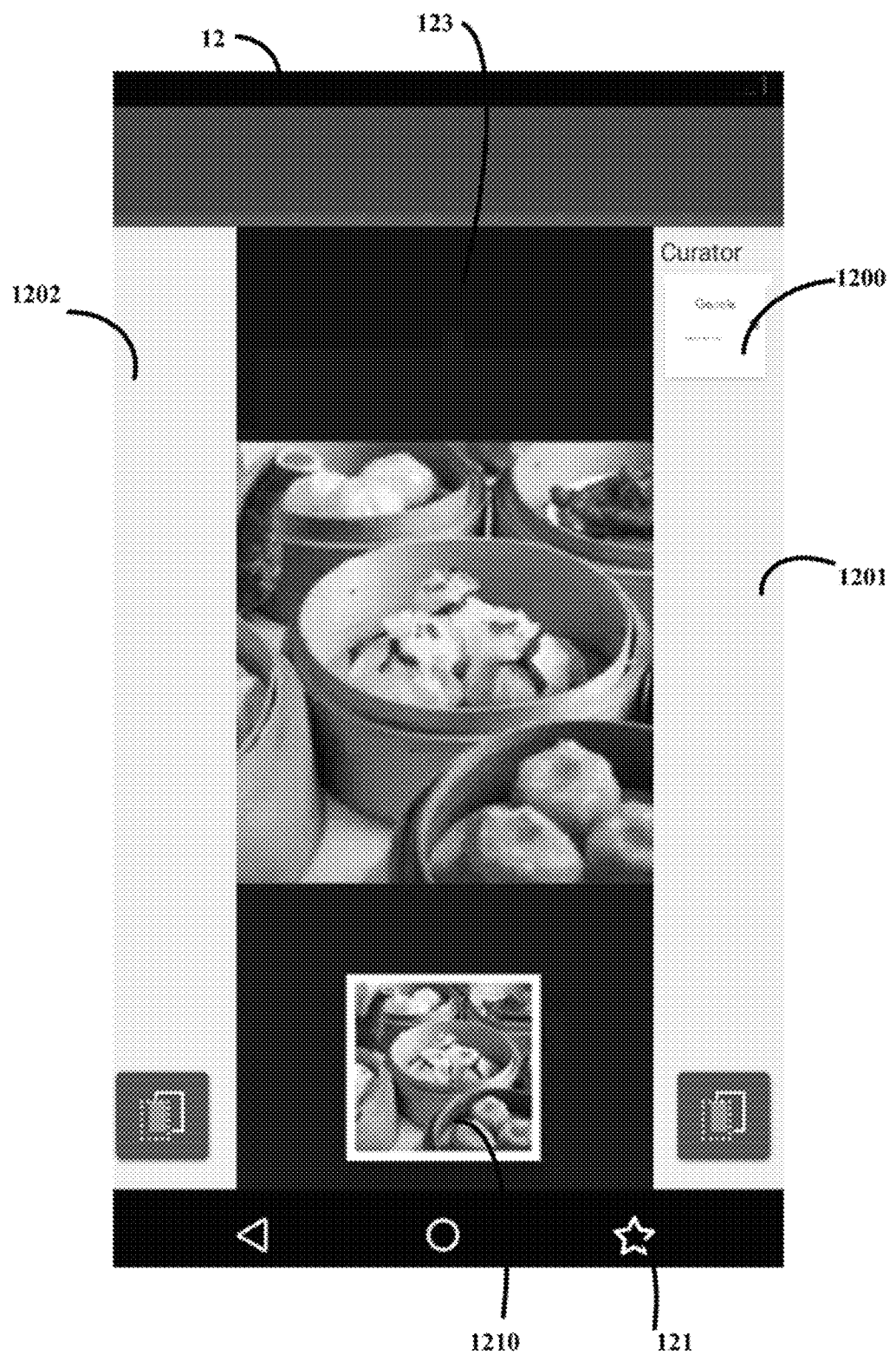
FIGS. 4B-4C illustrate an example of the second content.

At block 305, when the second input is detected, the processing module 1103 can move the first content to the first application layer as shown in FIG. 4B.

In at least one exemplary embodiment, the processing module 1103 can create, edit, present, and associate reminders with content collected or moved to the first application layer. The reminder can be assigned to a specific content, or to a collection of content, and its parameters are enhanced by on-device sensors and available service data. A reminder sets a determined condition and optionally associates the captured content with a condition and an expected result. In one embodiment, when the first content is moved to the first application layer, the processing module 1103 can create a first reminder for the first content by setting a first predetermined condition associated with the first content. When the first predetermined condition is met, the processing module 1103 can perform a function associated with the first content. In at least one exemplary embodiment, the first predetermined condition comprises a current position of the first electronic device 1 being in a predetermined geographical range, a current time being equal to a predetermined time, a current weather matches a predetermined weather, or a combination thereof.

In at least one exemplary embodiment, the function associated with the first content comprises opening a predetermined uniform resource locator (URL) included in the first content, dialing a predetermined phone number, displaying a predetermined image included in the first content, activating a predetermined application, or a combination thereof.

In at least one exemplary embodiment, the processing module 1103 can open the first content using the first program when the first content is dragged from the first application layer to the first user interface or an application icon of the first program.

Similarly, the managing system 110 can further capture other contents from other programs and can move the other contents to the first application layer. Details can be provided by referring to FIG. 4A.

At block 401, the display module 1101 can display a second user interface of a second program on the display 12 after the first content is moved to the first application layer.

For example, the display module 1101 can display a user interface of an image viewer on the display 12.

At block 402, the detecting module 1102 can detect whether a third input is received by the first electronic device 1. When the third input is detected by the detecting module 1102, the process goes to block 403.

In at least one exemplary embodiment, the step of detecting whether the third input is received comprises detecting whether a touch on the predetermined virtual key or the predetermined icon displayed on the display 12 is received. In one exemplary embodiment, the step of detecting whether the third input is received comprises detecting whether a press on the predetermined physical key (for example, the volume button assigned to modify volume) of the first electronic device 1 is received. In one exemplary embodiment, the step of detecting whether the third input is received comprises detecting whether a gesture via a sensor (for example, a proximity sensor) of the electronic device 1 is received. In other exemplary embodiment, the step of detecting whether the third input is received comprises detecting whether a voice via a microphone of the electronic device 1 is received.

At block 403, when the third input is detected, the processing module 1103 can capture a second proxy view (hereinafter refer to as "second content") from the second user interface. The display module 1101 can display the second content at a third position on the display 12, and can display the first application layer at the second position.

In at least one exemplary embodiment, the third position and the first position can be the same position. In other exemplary embodiments, the third position and the first position can be different positions.

In at least one exemplary embodiment, the second content can be associated with at least one type of data including, but not limited to, a photo, a screenshot, a text string, a text file, a website link, a link to a file, a video file, an audio file of the second program, or a combination thereof. For example, the second content is associated with a photo currently displayed by the image viewer, and a screenshot of the user interface of the image viewer. In at least one exemplary embodiment, when the first content is captured, at least one parameter, for example, an altitude, a location, a compass direction, level information, watermarks, or any combination of OSD (on screen display) can be captured by sensors and recorded together with the first content. For example, the captured screenshot can include at least one of the parameters shown thereon. In at least one exemplary embodiment, the first application layer is dragged out from the first border (e.g., the right border) of the display 12 when the third input is detected. In another embodiment, the first application layer can appear in any position or in any form (e.g. a transparent sheet), over an existing application on the display 12.

For example, as shown in FIG. 4B, when a touch on the virtual icon 121 displayed on the display 12 is detected, the processing module 1103 can capture a second content 1210 from a second user interface 123 of an image viewer. The display module 1101 can display the second content 1210 at the lower middle position of the display 12. The display module 1101 can further display the first application layer 1201 at the right border of the display 12. In at least one exemplary embodiment, the first application layer 1201 is dragged out from the right border of the display 12. In another embodiment, the first application layer 1201 can appear in any position or in any form (e.g. a transparent sheet), over an existing application on the display 12.

At block 404, the detecting module 1102 can detect whether a fourth input is received by the first electronic device 1. When the fourth input is detected by the detecting module 1102, the processes goes to block 405.

In at least one exemplary embodiment, the step of detecting whether the fourth input is received comprises detecting whether a touch movement from the third position to the second position on the display 12 is received. In one exemplary embodiment, the step of detecting whether the fourth input is received comprises detecting whether a gesture via a sensor of the electronic device or a voice via a microphone of the electronic device is received. In one exemplary embodiment, the step of detecting whether the fourth input is received comprises detecting whether a press on a physical key associated with a copy function or a touch on a virtual key associated with a copy function is received.

Figure 4C:
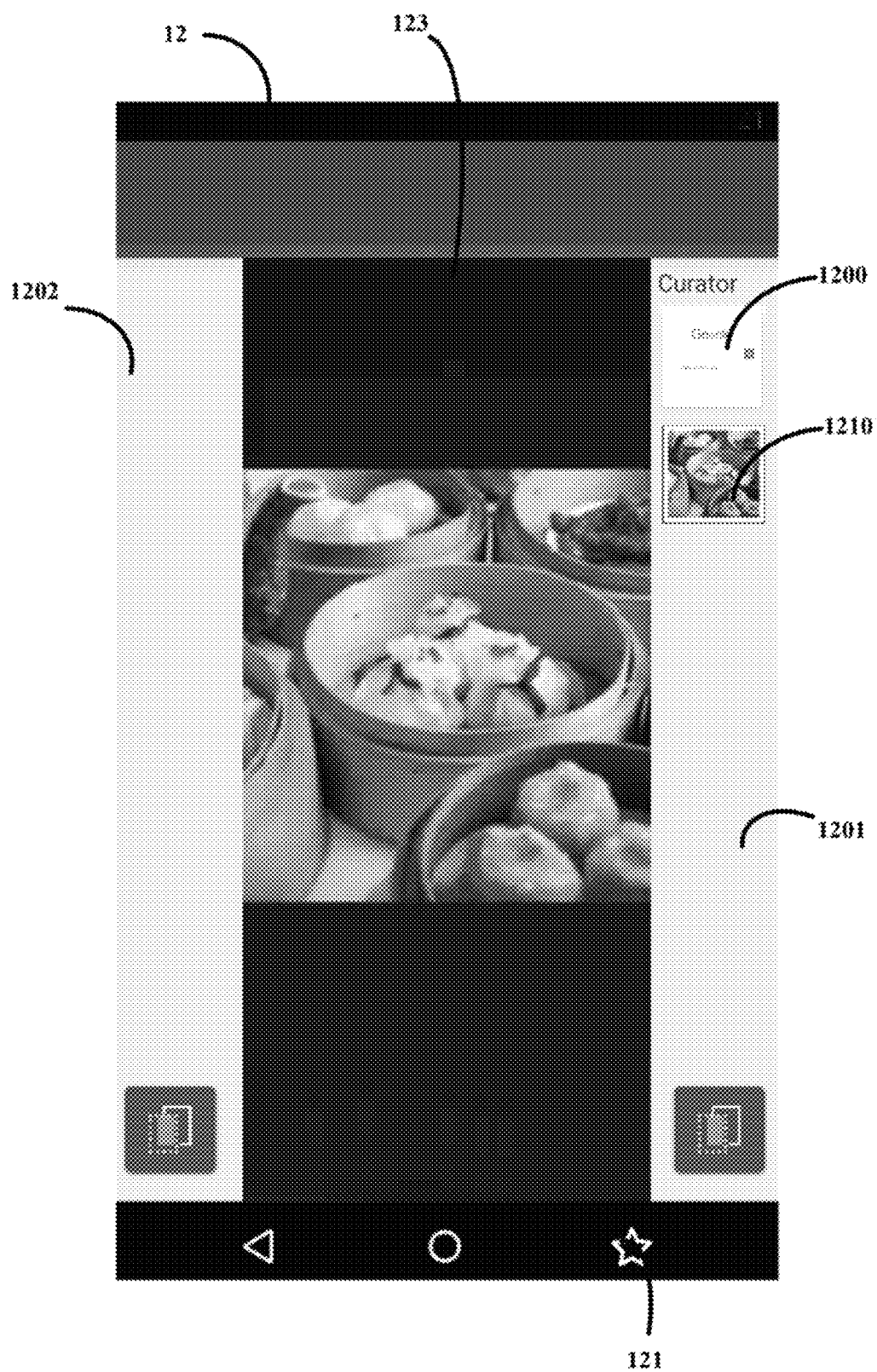

At block 405, when the fourth input is detected, the processing module 1103 can move the second content to the first application layer as shown in FIG. 4C.

In at least one exemplary embodiment, the processing module 1103 can create, edit, present, and associate reminders with content collected or moved to the first application layer. The reminder can be assigned to a specific content, or to a collection of content, and its parameters are enhanced by on-device sensors and available service data. A reminder sets a determined condition and optionally associates the captured content with a condition and an expected result. In one embodiment, when the second content is moved to the first application layer, the processing module 1103 can create a second reminder for the second content by setting a second predetermined condition associated with the second content. When the second predetermined condition is met, the processing module 1103 can perform a function associated with the second content. In at least one exemplary embodiment, the second predetermined condition comprises a current position of the first electronic device 1 being in a predetermined geographical range, a current time being equal to a predetermined time, a current weather matches a predetermined weather, or a combination thereof.

In at least one exemplary embodiment, the function associated with the second content comprises opening a predetermined uniform resource locator (URL) included in the second content, dialing a predetermined phone number, displaying a predetermined image included in the second content, activating a predetermined application, or a combination thereof.

In at least one exemplary embodiment, the processing module 1103 can open the second content using the second program when the second content is dragged from the first application layer to the second user interface or an application icon of the second program.

FIGS. 5A-5C illustrate an example of the first application layer 1201 and folders thereof. In at least one exemplary embodiment, the first application layer 1201 can be fully dragged out from the right border of the display 12. For example, the first application layer 1201 shown in FIG. 4C can be dragged out further by a touch movement on the display 12 from any point within the first application layer 1201 toward the center or the left border of the display 12 and then substantially fully displayed on the display 12 as shown in FIG. 5A. In this embodiment, the first content 1200 and the second content 1210 have been moved to and presented in the first application layer 1201.

Referring now to FIGS. 5A-5B, in at least one exemplary embodiment, the processing module 1103 can create at least one folder in the first application layer 1201 by any conventional means, e.g., detecting a selection of an item "create folder" on a menu (not shown). In this embodiment, a folder A and a folder B (i.e. Curation A and Curation B shown in FIGS. 5A-5B) are created in the first application layer 1201. The processing module 1103 can move the first content 1200 and the second content 1210 to the folder A in response to a first predetermined input and a second predetermined input respectively. In at least one exemplary embodiment, the first predetermined input can be a touch movement from the first content 1200 to the folder A, and the second predetermined input can be a touch movement from the second content 1210 to the folder A. In other exemplary embodiments, the processing module 1103 can move the first content 1200 to the folder A and move the second content 1210 to the folder B.

Referring now to FIGS. 5A-5C, in one exemplary embodiment, the first application layer 1201 can support hierarchy structure for managing the folder A, the folder B, the first content 1200 and the second content 1210. In one embodiment where the first application layer 1201 support hierarchy structure, a sub-folder A-1 (i.e. Curation A-1 shown in FIG. 5C) can be further created in the folder A, and the sub-folder A-1 can further include at least one sub-folder A-1-1 (i.e. Curation A-1-1 shown in FIG. 5C) created and at least one content 1215 captured by means similar to those for the first and second content described above. Further, a breadcrumb, e.g. "Curator", "Curation A" or "Curation A-1", is displayed at the top of the first application layer 1201 showing the location of the folder in the overall hierarchical structure as shown in FIGS. 5A-5C.

Figure 6A:
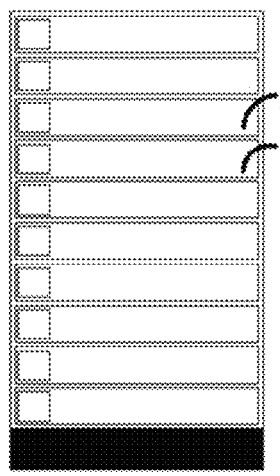
FIGS. 6A-6H illustrate eight layout templates of various exemplary embodiments of the first application layer and its folder and sub-folder shown in FIGS. 5A-5C.
Figure 6B:
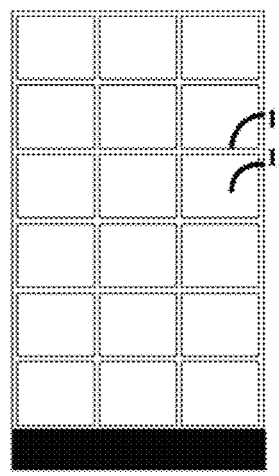
Figure 6C:
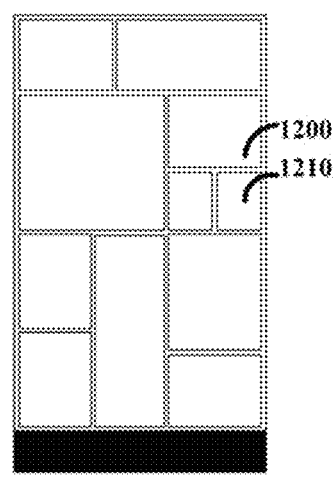
Figure 6D:
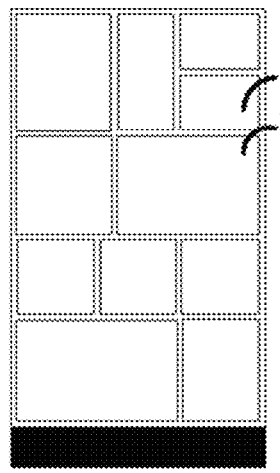
Figure 6E:
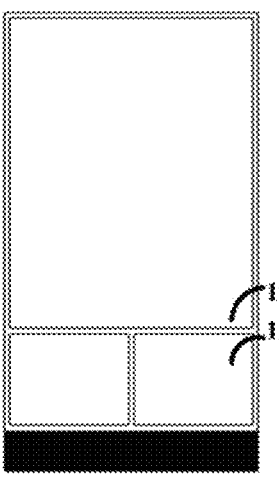
Figure 6F:
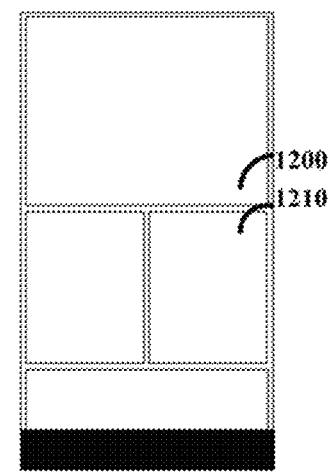
Figure 6G:
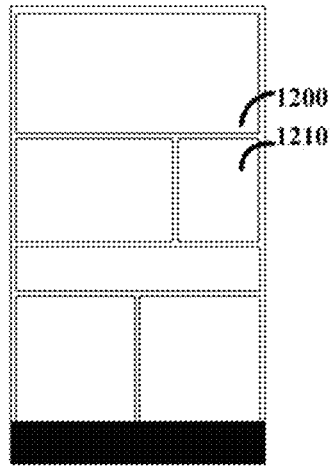
Figure 6H:
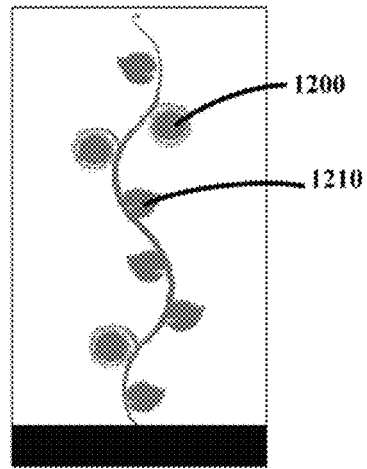

In one exemplary embodiment, when the first content 1200 and the second content 1210 are moved to the first application layer 1201, the first content 1200 and the second content 1210 can be arranged in a default layout in the first application layer 1201 as shown in FIG. 5A. FIGS. 6A-6H illustrate eight layout templates of various exemplary embodiments of the first application layer 1201 and the folder/sub-folder shown in FIGS. 5A-5C. In one embodiment, the layout template shown in FIG. 6A is the default layout used by the first content 1200, the second content 1210, the folder A and the sub-folder A-1 as shown in FIGS. 5A-5C.

In one exemplary embodiment, when the first content 1200 and the second content 1210 are moved to the folder A, the first content 1200 and the second content 1210 can also be arranged in the default layout, as shown in FIG. 6A, in the folder A. In other exemplary embodiments, the layout used by the first content 1200, the second content 1210, the folder A and the sub-folder A-1 can be changed according to an exemplary method 500 described below.

In at least one exemplary embodiment, the processing module 1103 can create a third reminder for a folder of the first application layer, e.g. the folder A shown in FIG. 5A, by setting a third predetermined condition associated with the folder. When the third predetermined condition is met, the processing module 1103 can perform a function associated with the folder. In at least one exemplary embodiment, the third predetermined condition comprises a current position of the first electronic device 1 being in a predetermined geographical range, a current time being equal to a predetermined time, a current weather matches a predetermined weather, or a combination thereof. In at least one exemplary embodiment, the function associated with the folder comprises opening a predetermined uniform resource locator (URL) included in a content, e.g. the first content 1200 or the second content 1210, of the folder, dialing a predetermined phone number, displaying a predetermined image included in the content of the folder, activating a predetermined application, or a combination thereof.

Figure 7A:
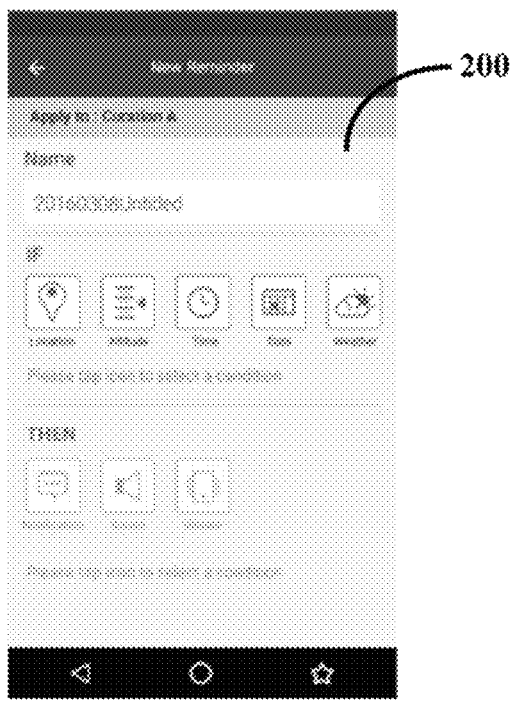
FIGS. 7A and 7B illustrate an example of a user interface for creating a new reminder for a folder shown in FIG. 5A.
Figure 7B:
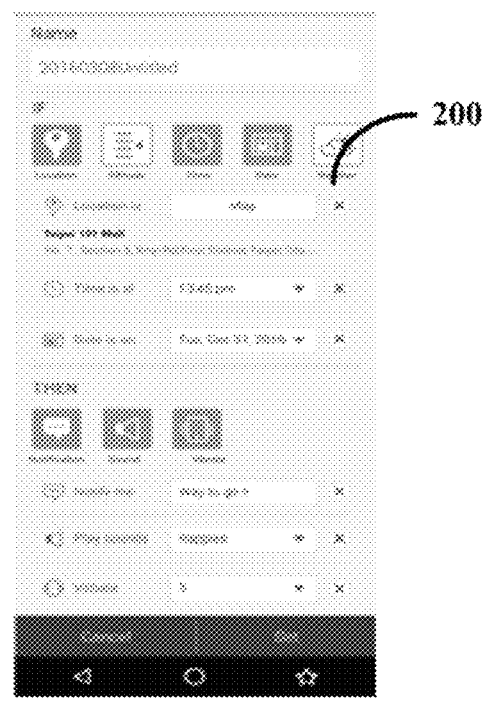

FIGS. 7A and 7B illustrate an example of a user interface 200 for creating a new reminder for a folder shown in FIG. 5A. The user interface 200 can includes "IF/THEN" statements for setting a reminder for a folder. In one exemplary embodiment, the new reminder can be the third reminder for the folder described above, the first reminder for the first content or the second reminder for the second content as described in the embodiments described above. In FIGS. 7A and 7B, a predetermined condition "IF" comprises, but is not limited to, "Location", "Altitude", "Time", "Date" or "Weather", and a function performed under "THEN" comprises, but is not limited to, displaying a notification set by a user, generating a sound set by the user or generating a vibration with a period of time set by the user as shown in FIGS. 7A and 7B.

Figure 7C:
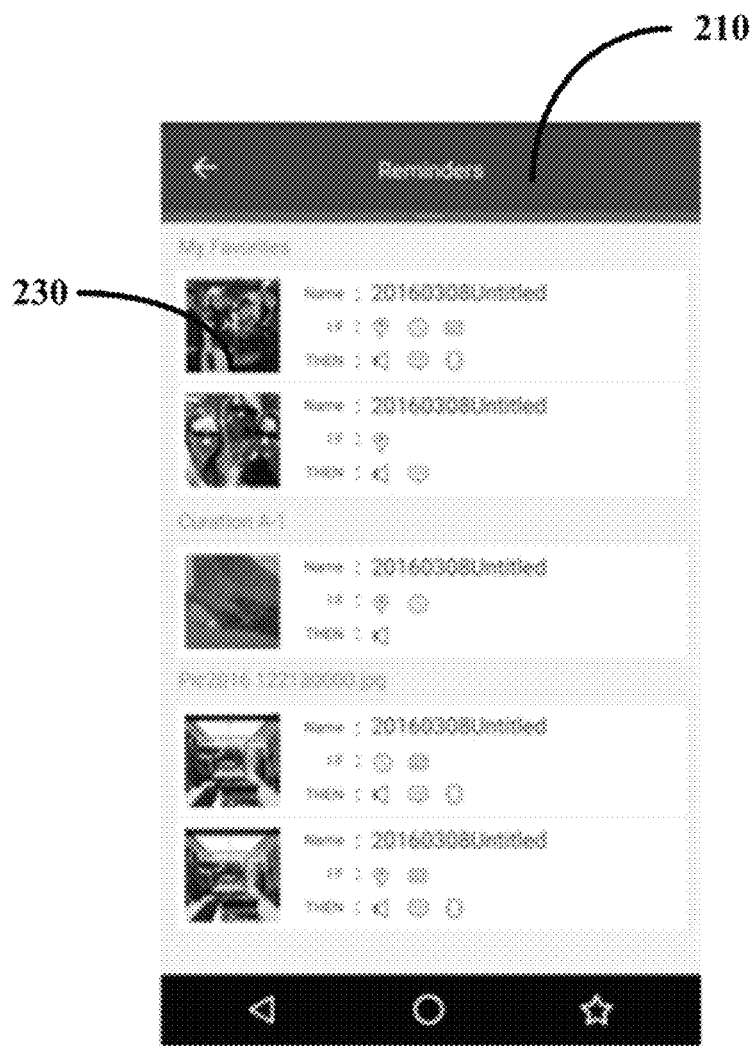
FIG. 7C illustrates an example of a reminder list.

In one embodiment, the reminder encompasses various combinations of sensed data such as time and date (as in typical Calendaring and Alarm clock functions), geolocation (specific point, or entering/leaving an area), altitude, light in conjunction with a camera, humidity, battery level, object density, audio, weather condition, compass direction, elapsed time or distance, heartrate, blood oxygen level, temperature, or a tracked series of inputs ('notify me if I perform this sequence . . . '). A master reminder list 210 as shown in FIG. 7C is available from the first application layer 1201 or any folder thereof and can list all reminders 230 and their referring folders or captured contents. Further, the user can add, delete, or modify a reminder 230 from the master list 210.

Figure 8:
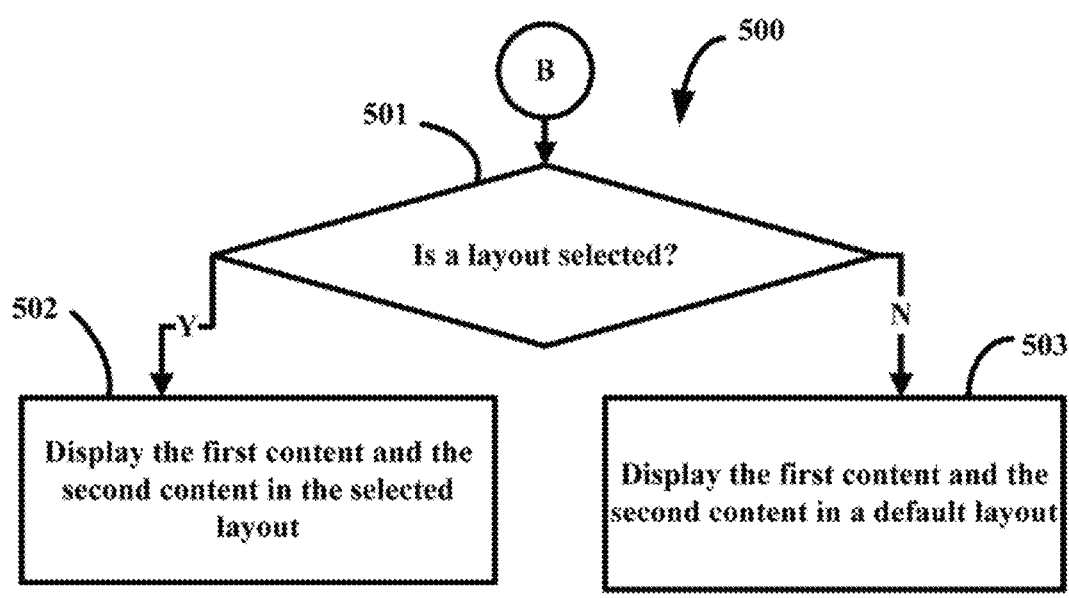
FIG. 8 illustrates a third flowchart of one exemplary embodiment of a method of arranging the first and second content using the managing system of FIG. 1.

FIG. 8 illustrates a flowchart of arranging contents such as the first content and the second content in the first application layer, which is presented in accordance with an exemplary embodiment. The exemplary method 500 is provided by way of example, as there are a variety of ways to carry out the method. The exemplary method 500 described below can be carried out using the configurations illustrated in FIG. 1, for example, and various elements of these figures are referenced in explaining exemplary method 500. Each block shown in FIG. 8 represents one or more processes, methods, or subroutines, carried out in the exemplary method 500. Additionally, the illustrated order of blocks is by example only and the order of the blocks can be changed according to the present disclosure. The exemplary method 500 can begin at block 501. Depending on the embodiment, additional steps can be added, others removed, and the ordering of the steps can be changed.

At block 501, the detecting module 1102 can detect whether a layout for the first application layer 1201 with the first content 1200 and the second content 1210 included or for the folder A with the same included is selected, for example, from a menu showing the layout templates (as shown in FIGS. 6A-6H) to be selected. When a layout is selected, the process goes to block 502. When no layout is selected, the process goes to block 503.

In at least one exemplary embodiment, the display module 1101 can provide a menu, a list or icons representing the plurality of layout templates shown in FIGS. 6A-6H for a user to select. When the user selects one of the plurality of layout templates, the process goes to block 502. When the user does not select any one of the plurality of layout templates, the process goes to block 503.

At block 502, the display module 1101 can display the first content and the second content in the selected layout.

At block 503, the display module 1101 can display the first content and the second content in a default layout.

In at least one exemplary embodiment, the default layout can be the layout template shown in FIG. 6A while the selected layout can be one of the layout templates shown in FIGS. 6B-6H.

In at least one exemplary embodiment, each of the plurality of layout templates defines a predetermined number of contents to be displayed on the display 12, and further defines each of the predetermined number of contents corresponding to a predetermined area on the display 12. In at least one exemplary embodiment, the predetermined areas can have a same size and a shape or can have different sizes and shapes. In at least one exemplary embodiment, the predetermined number can be 3, 5, 7, 8, 15, etc.

In at least one exemplary embodiment, the plurality of layout templates have different data structures, different layouts, or different graphics, and each of the plurality of layout templates corresponds to different functions and can be edited. For example, different templates can support different data models and can also represent the same data model differently (e.g., showing pictures as image grid or image thumbnail+text) or represent different data models the same (e.g., showing everything in the folder as an image). That is to say, each folder can be represented in a multiplicity of display styles as supported by templates. In at least one exemplary embodiment, the functions comprise adding a folder or a content in the first application layer, moving a folder or a content in the first application layer, copying a folder or a content from in the first application layer, deleting a folder or a content in the first application layer, sharing a folder to other users in the first application layer, adding one or more reminders to a folder or a content in the first application layer, and etc.

Figure 9:
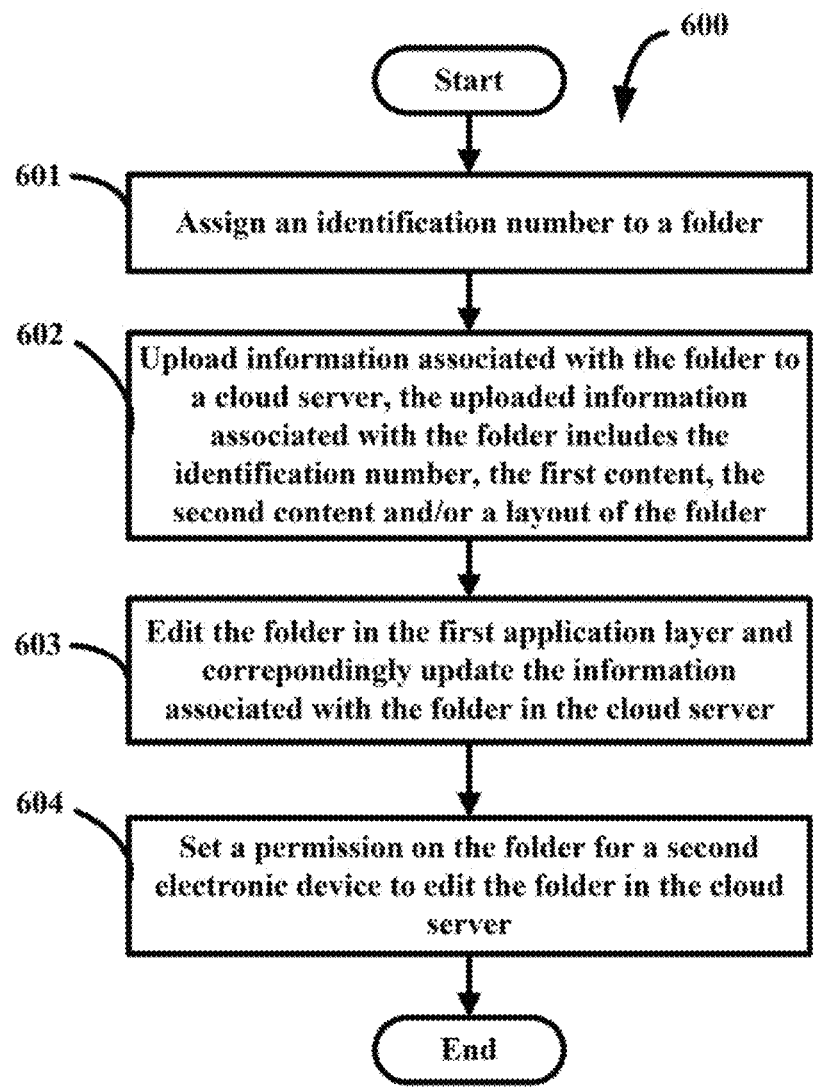
FIG. 9 illustrates a fourth flowchart of one exemplary embodiment of a method of sharing the first and second content using the managing system of FIG. 1.

FIG. 9 illustrates a flowchart of sharing contents such as the first content and the second content in the folder, which is presented in accordance with an exemplary embodiment. The exemplary method 600 is provided by way of example, as there are a variety of ways to carry out the method. The exemplary method 600 described below can be carried out using the configurations illustrated in FIG. 1, for example, and various elements of these figures are referenced in explaining exemplary method 600. Each block shown in FIG. 9 represents one or more processes, methods, or subroutines, carried out in the exemplary method 600. Additionally, the illustrated order of blocks is by example only and the order of the blocks can be changed according to the present disclosure. The exemplary method 600 can begin at block 601. Depending on the embodiment, additional steps can be added, others removed, and the ordering of the steps can be changed.

At block 601, the processing module 1103 can assign an unique identification number to a folder, e.g. Curation A or Curation B shown in FIG. 5A. In at least one exemplary embodiment, the processing module 1103 can assign the identification number when the folder is created and contains at least one captured content, e.g. the first content 1200 and the second content 1210. In one embodiment, the electronic device 1 can receive information associated with at least one advertisement from a server based on the assigned identification number. In another embodiment, the processing module 1103 can also assign a title for the folder, a layout template for the folder, and interests of the folder. The interests can be registered with an interest engine.

At block 602, the processing module 1103 can upload information associated with the folder to a cloud server 2 that is in communication with the first electronic device 1. The uploaded information associated with the folder includes the identification number, the first content, the second content and/or a layout of the folder.

In at least one exemplary embodiment, the processing module 1103 can also assign an unique identification number to each content contained in the folder, and can upload the unique identification number assigned to each content to the cloud server 2. The processing module 1103 can set each unique identification number being associated with a predetermined advertisement. When a user touches or clicks the folder or the content contained in the folder, the predetermined advertisement appears and is displayed in a predetermined position on the display 12. In at least one exemplary embodiment, the predetermined position can be any corner of the display 12.

At block 603, the processing module 1103 can edit the folder in the first application layer and correspondingly update the information associated with the folder in the cloud server 2.

In at least one exemplary embodiment, the editing of the folder comprises editing the contents such as the first content and the second content contained in the folder, changing a layout for the folder, adding one or more contents in the folder, deleting one or more contents in the folder, or a combination thereof. It should be noted that the plurality of layout templates shown in FIGS. 6A-6H can also be applied to the folder. In other words, the contents contained in the folder can also be displayed in one of the plurality of layout templates.

At block 604, the processing module 1103 can set a permission on the folder for a second electronic device 3 to edit the folder in the cloud server 2. In at least one embodiment, the message and the folder can be associated using the identification number assigned to the folder. In at least one exemplary embodiment, the second electronic device can edit the folder by editing the contents such as the first content and the second content contained in the folder, changing a layout for the folder, adding one or more contents in the folder, deleting one or more contents in the folder, or a combination thereof.

Figure 10A:
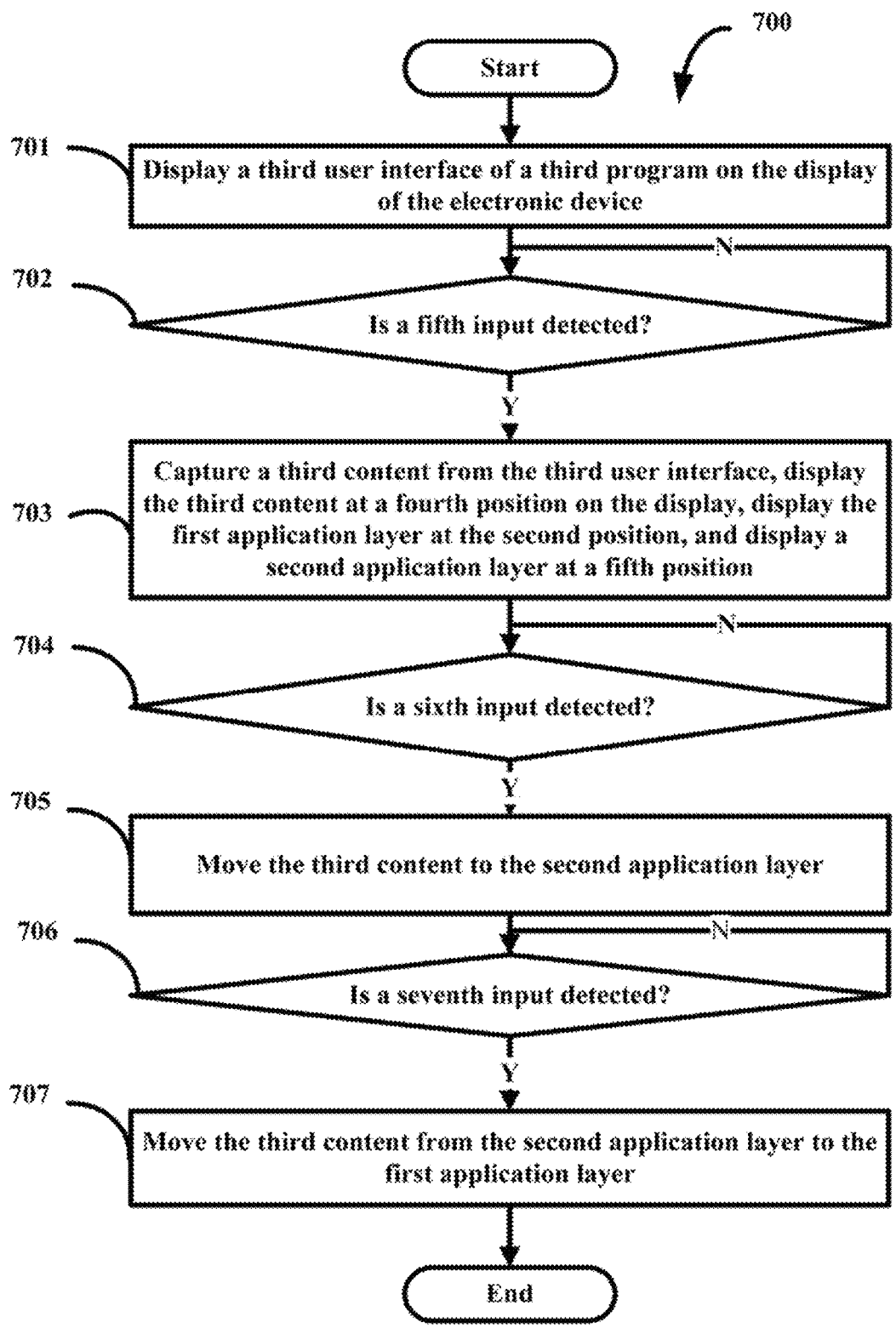
FIG. 10A illustrates a fifth flowchart of one exemplary embodiment of a method of capturing a third content using the managing system of FIG. 1.

FIG. 10A illustrates a flowchart which is presented in accordance with an example embodiment. The exemplary method 700 is provided by way of example, as there are a variety of ways to carry out the method. The method 700 described below can be carried out using the configurations illustrated in FIG. 1, for example, and various elements of these figures are referenced in explaining exemplary method 700. Each block shown in FIG. 10A represents one or more processes, methods, or subroutines, carried out in the exemplary method 700. Additionally, the illustrated order of blocks is by example only and the order of the blocks can be changed according to the present disclosure. The exemplary method 700 can begin at block 701. Depending on the embodiment, additional steps can be added, others removed, and the ordering of the steps can be changed.

At block 701, the display module 1101 can display a third user interface of a third program on the display 12 of the first electronic device 1.

For example, the display module 1101 can display a user interface of an icon management program on the display 12.

At block 702, the detecting module 1102 can detect whether a fifth input is received by the first electronic device 1. When the fifth input is detected by the detecting module 1102, the process goes to block 703.

In at least one exemplary embodiment, the step of detecting whether the fifth input is received comprises detecting whether a touch on a predetermined virtual key or a predetermined icon displayed on the display 12 is received. In other exemplary embodiments, the step of detecting whether the fifth input is received comprises detecting whether a press on a predetermined physical key (for example, a volume key) of the first electronic device 1.

At block 703, when the fifth input is detected, the processing module 1103 can capture a third proxy view (hereinafter refer to as "third content") from the third user interface. The display module 1101 can display the third content at a fourth position on the display 12, and can display the first application layer at the second position. The display module 1101 can further display a clipboard system (hereinafter refer to as "second application layer") at a fifth position on the display 12.

In at least one exemplary embodiment, the fourth position is between the second position and the fifth position. In other words, the third content can be displayed between the first application layer and the second application layer.

In at least one exemplary embodiment, the third content is associated with at least one type of data including, but not limited to, a photo, a screenshot, a text string, a text file, a website link, a link to a file, a video file, an audio file of the third program, or a combination thereof. For example, the third content can be associated with a screenshot of the third user interface of the icon management program, and icons currently displayed on the third user interface. In at least one exemplary embodiment, the first application layer is dragged out from the first border (e.g., the right border) of the display 12 while the second application layer is dragged out from a second border (e.g., a left border) of the display 12 when the fifth input is detected. In another embodiment, the first application layer and the second application layer can appear in a first position and a second position respectively on the display 12, or in any form (e.g. a transparent sheet), over an existing application on the display 12.

Figure 10B:
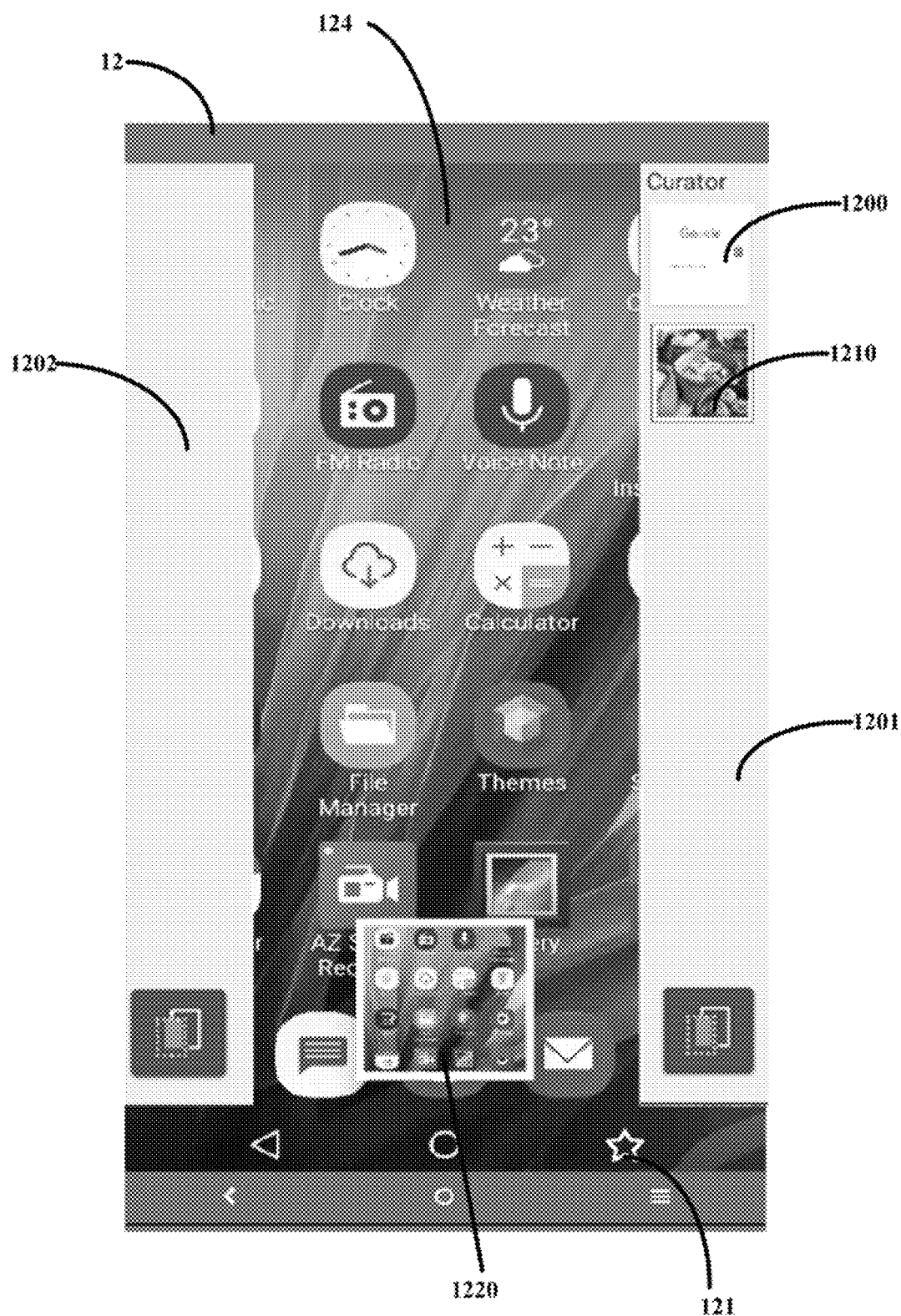
FIG. 10B illustrates an example of the third content.

For example, as shown in FIG. 10B, when a touch on the virtual icon 121 displayed on the display 12 is detected, the processing module 1103 can capture a third content 1220 from a third user interface 124 of the icon management program. The display module 1101 can display the third content 1220 at the lower middle position of the display 12. The display module 1101 can further display a first application layer 1201 at the right border of the display 12 and can display a second application layer 1202 at the left border of the display 12. In at least one exemplary embodiment, the first application layer 1201 is dragged out from the right border of the display 12 while the second application layer 1202 is dragged out from the left border of the display 12 when the fifth input is detected. In another embodiment, the first application layer 1201 and the second application layer 1202 can appear in a first position and a second position respectively on the display 12, or in any form (e.g. a transparent sheet), over an existing application on the display 12.

At block 704, the detecting module 1102 can detect whether a sixth input is received by the first electronic device 1. When the sixth input is detected by the detecting module 1102, the processes goes to block 705.

In at least one exemplary embodiment, the sixth input can be a touch movement from the fourth position to the second position on the display 12 or a touch movement from the fourth position to the fifth position on the display 12.

At block 705, when the sixth input is detected, the processing module 1103 can move the third content 1220 to either the first application layer 1201 or the second application layer 1202. In this embodiment, when the sixth input is detected, the processing module 1103 moves the third content 1220 to the second application layer 1202. In other embodiment, when the sixth input is detected, the processing module 1103 moves the third content 1220 to the first application layer.

In at least one exemplary embodiment, when the sixth input is the touch movement from the fourth position to the fifth position, the processing module 1103 can move the third content 1220 to the second application layer 1202. In at least one exemplary embodiment, when the second application layer 1202 further includes other contents for example a fourth content, the third content 1220 and the fourth content in the second application layer 1202 can be arranged based on one or more predetermined properties. In at least one exemplary embodiment, the predetermined property can be time, on which each of the third content and the fourth content is moved to the second application layer 1202. In at least one exemplary embodiment, the predetermined property can be titles of the third content and the fourth content or sizes of the third content and the fourth content. In other exemplary embodiments, the third content 1220 and the fourth content can be arranged randomly in the second application layer 1202. In other exemplary embodiment, when the sixth input is the touch movement from the fourth position to the second position, the processing module 1103 can move the third content 1220 to the first application layer 1201.

At block 706, the detecting module 1102 can detect whether a seventh input is received by the first electronic device 1. When the seventh input is detected by the detecting module 1102, the process goes to block 707.

In at least one exemplary embodiment, the seventh input is the touch movement from the third content to the first application layer. In other exemplary embodiments, the seventh input is the touch movement from the third content to the second application layer, or the seventh input is a gesture detected by a sensor of the electronic device or a voice detected by a microphone of the electronic device.

At block 707, when the seventh input is detected, the processing module 1103 can move the third content from the second application layer to the first application layer. In other exemplary embodiment, when the seventh input is detected, the processing module 1103 can move the third content from the first application layer to the second application layer.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for managing content of an electronic device, the method comprising:
   displaying a first user interface of a first program on a display of the electronic device;
   detecting a first input and, in response to the first input, displaying at a first position a first content captured from the first user interface and displaying at a second position a first application layer;
   detecting a second input and, in response to the second input, moving the first content to the first application layer;
   after moving the first content to the first application layer, displaying a second user interface of a second program on the display;
   detecting a third input and, in response to the third input, displaying at a third position a second content captured from the second user interface and displaying at the second position the first application layer;
   detecting a fourth input and, in response to the fourth input, moving the second content to the first application layer, wherein an input type of the first input and an input type of the third input belong to a same first input type, an input type of the second input and an input type of the fourth input belong to a same second input type, the first input type is different from the second input type;
   after moving the second content to the first application layer, displaying the first application layer with the first content and the second content arranged in a first layout; detecting whether a second layout is selected; and
   displaying the first application layer with the first content and the second content arranged in the second layout when the second layout is selected, wherein the first content and the second content are associated with two different data types, respectively;
   after moving the first content to the first application layer, automatically creating by the electronic device a first reminder for the first content by setting a first predetermined condition based on a first data captured and received by first sensors received from the electronic device when the first data is captured;
   when the first predetermined condition is met, automatically performing by the electronic device a function associated with the first content,
   after moving the second content to the first application layer, automatically creating by the electronic device a second reminder for the second content by setting a second predetermined condition based on a second data captured and received by first sensors received from the electronic device when the second data is captured; and
   automatically performing by the electronic device a function associated with the second content when the second predetermined condition is met;
   wherein the first predetermined condition is same to the second predetermined condition;
   displaying at least a portion of the first data with the first content and at least a portion of the second data with the second content when either the first content or second content is displayed.

2. The method according to claim 1, wherein the data type includes one of a photo, a screenshot, a text string, a text file, a website link, a link to a file, a video file and an audio file.

3. The method according to claim 1, wherein the display is a touch display, the step of detecting the first input comprises detecting a touch on a virtual key or a virtual icon displayed on the touch display, and the step of detecting the third input comprises detecting another touch on the virtual key or the virtual icon.

4. The method according to claim 1, wherein the step of detecting the first input comprises detecting a press on a physical key, and the step of detecting the third input comprises detecting another press on the physical key.

5. The method according to claim 1, wherein the step of detecting the first input comprises detecting a gesture via a second sensor of the electronic device or a voice via a microphone of the electronic device, and the step of detecting the third input comprises detecting another gesture via the second sensor or another voice via the microphone.

6. The method according to claim 1, wherein the display is a touch display, the step of detecting the second input comprises detecting a touch movement from the first position to the second position on the touch display, and the step of detecting the fourth input comprises detecting another touch movement from the third position to the second position on the touch display.

7. The method according to claim 1, wherein the step of detecting the second input comprises detecting a gesture via a second sensor of the electronic device or a voice via a microphone of the electronic device, and the step of detecting the fourth input comprises detecting another gesture via the second sensor or another voice via the microphone.

8. The method according to claim 1, further comprising:
   in response to the first input or the third input, displaying at a fourth position a second application layer, wherein the first content or the second content is displayed between the first application layer and the second application layer on the display.

9. The method according to claim 1, further comprising:
   displaying a third user interface of a third program on the display;
   detecting a fifth input and, in response to the fifth input, displaying the first application layer, a second application layer, and a third content captured from the third user interface between the first and second application layers;
   detecting a sixth input and, in response to the sixth input, moving the third content to either the first application layer or the second application layer.

10. The method according to claim 9, further comprising:
    in response to the sixth input, moving the third content to the second application layer; and
    detecting a seventh input and, in response to the seventh input, moving the third content from the second application layer to the first application layer.

11. The method according to claim 9, further comprising:
    in response to the sixth input, moving the third content to the first application layer; and
    detecting a seventh input and, in response to the seventh input, moving the third content from the first application layer to the second application layer.

12. The method according to claim 9, wherein the second application layer includes a fourth content, and the third content and the fourth content in the second application layer are arranged based on at least one predetermined property, and wherein the predetermined property is titles of the third content and the fourth content, sizes of the third content and the fourth content, or time, on which each of the third content and the fourth content are moved to the second application layer.

13. The method according to claim 1, further comprising:
creating a folder in the first application layer, and moving the first content to the folder in response to an eighth input after the first content is moved to the first application layer.

14. The method according to claim 13, further comprising:
creating a third reminder for the folder by setting a third predetermined condition associated with the folder;
when the third predetermined condition is met, performing a function associated with the folder.

15. The method according to claim 14, wherein the third predetermined condition comprises a current position of the electronic device being in a predetermined geographical range, a current time being equal to a predetermined time, or a current weather matches a predetermined weather.

16. The method according to claim 15, wherein the function comprises displaying a notification, generating a sound or generating a vibration.

17. The method according to claim 15, wherein the function associated with the folder comprises opening a predetermined uniform resource locator (URL) included in the first or the second content, dialing a predetermined phone number, displaying a predetermined image included in the first or the second content, or activating a predetermined application.

18. The method according to claim 13, further comprising:
moving the second content to the folder in response to a ninth input after the second content is moved to the first application layer.

19. The method according to claim 13, further comprising:
assigning an identification number to the folder when the folder is created.

20. The method according to claim 19, further comprising:
receiving information associated with an advertisement from a server based on the identification number.

21. The method according to claim 19, further comprising:
uploading information associated with the folder to a cloud server, wherein the information associated with the folder includes the identification number, the first content or a layout of the folder.

22. The method according to claim 21, further comprising:
editing the folder in the first application layer; and
updating the information associated with the folder in the cloud server.

23. The method according to claim 21, further comprising:
setting a permission on the folder for a second electronic device to edit the folder in the cloud server.

24. The method according to claim 1, wherein before the step of detecting whether the second layout is selected, the method further comprises:
providing a plurality of layout templates for being selected, wherein the second layout is one of the layout templates.

25. The method according to claim 24, wherein the plurality of layout templates have different data structures, different layouts, or different graphics.

26. The method according to claim 1, wherein both the first predetermined condition and the second predetermined condition comprise a current position of the electronic device being in a predetermined geographical range, and a current time being equal to a predetermined time.

27. The method according to claim 1, wherein the function associated with the first content is same to the function associated with the second content; or the function associated with the first content is different from the function associated with the second content.

28. The method according to claim 27, wherein the function associated with the first content comprises opening a predetermined uniform resource locator (URL) included in the first content, and displaying a predetermined image included in the first content, or activating a predetermined application, and the function associated with the second content comprises opening a predetermined uniform resource locator (URL) included in the second content, displaying a predetermined image included in the second content, or activating a predetermined application.

* * * * *